Aug. 7, 1962     M. J. PURETIC     3,047,973
POWER-OPERATED NET-HANDLING DEVICE
Filed July 14, 1958
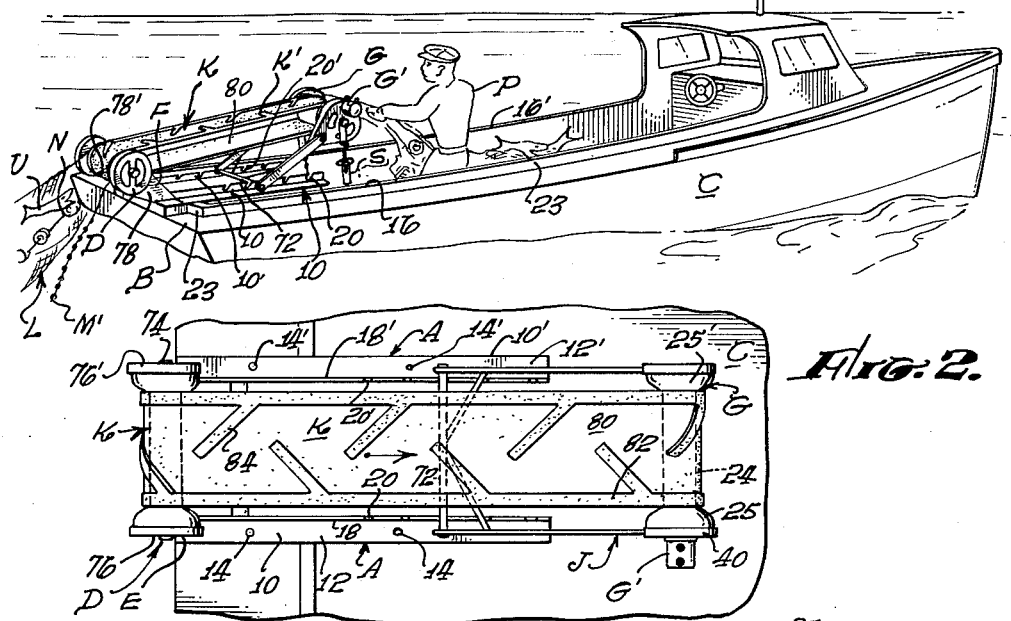
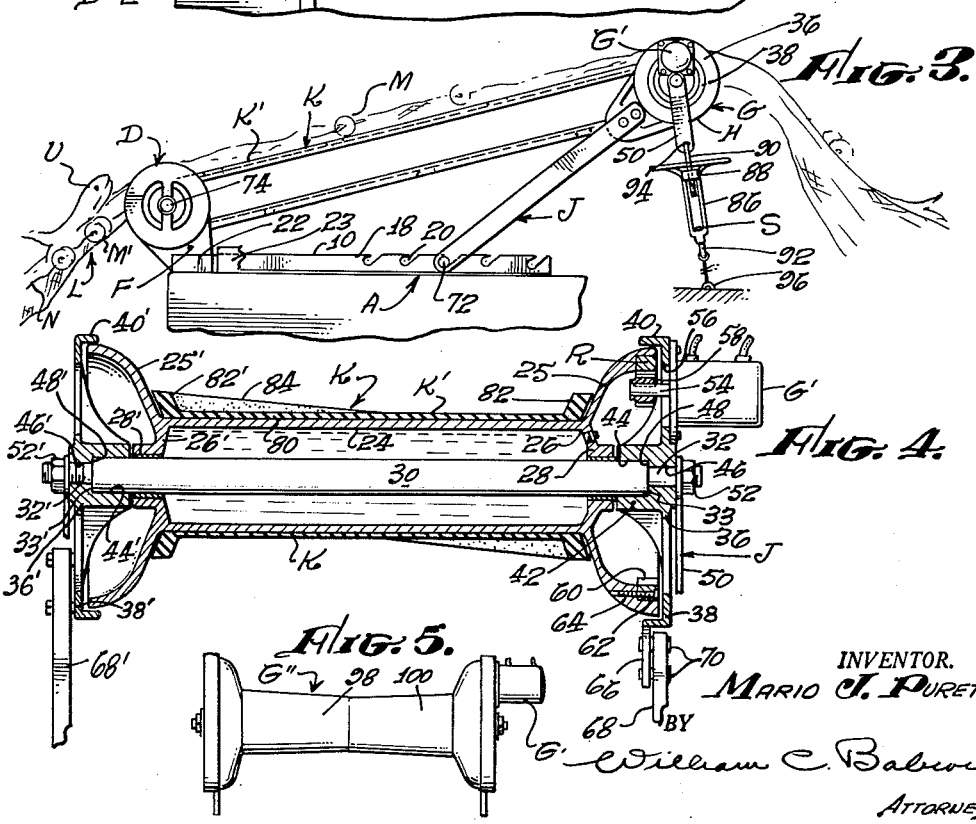
INVENTOR.
MARIO J. PURETIC,
BY William C. Babcock
ATTORNEY.

United States Patent Office 3,047,973
Patented Aug. 7, 1962

3,047,973
POWER-OPERATED NET-HANDLING DEVICE
Mario J. Puretic, 3514 Avenida Corona, San Pedro, Calif.
Filed July 14, 1958, Ser. No. 748,212
9 Claims. (Cl. 43—8)

The present invention relates to commercial fishing equipment, and more particularly to a method and a preferred and alternate form of power-operated device that may be employed in the practice of this method, partciularly in small open boats. When one of applicant's devices is mounted on an open boat it is possible by use of his method for a single operator to retrieve an elongate gill net and associated equipment, together with fish that may be gilled therein, from the sea, with consecutive sections of the whole as the retrieving operation takes place, being drawn to a first position aboard the fishing vessel, and concurrently transferring those sections which have reached the first position to a second position, from which said sections are moved downwardly as a column or mass that can be directed to a third stationary position aboardship.

Although a number of power-operated devices have been developed and marketed in the past, such as the net handling apparatus disclosed and claimed in applicant's Patent No. 2,733,531, these prior devices are not adapted for use in gill net fishing as practiced during the salmon season in Bristol Bay, Alaska in small open boats. In this area in particular, the government restricts the number of hours a day in which a fisherman may work. As is well known, salmon run in large schools but do not run every day, and unless a fisherman has the proper equipment, he may fail to secure his daily quota of fish. Applicant's present device and method of using same is particularly well adapted for use on small fishing vessels of the type described which do not have sufficient superstructure to support the equipment presently available that is large enough to handle the weight of a loaded gill net in withdrawing it from the sea.

Furthermore, prior apparatus and devices available for this purpose on the market today have a tendency to compact and frictionally engage the net in which fish are gilled during withdrawal thereof from the sea by causing the net to pass through a narrow restricted portion thereof, whereby all fish of any substantial size must be removed from the net prior to use of the equipment in retrieving the net.

In some commercial fishing methods, small boats are used in which two men comprise the crew. These boats normally have no superstructure from which one of the previously available power-operated net-retrieving devices could be supported at an elevated position. In addition, fishing from such small vessels is largely by use of a gill net that includes a cork line which floats on the surface of the water from which an elongate net panel depends that terminates in a lead line. Fish swimming individually or in schools encounter this panel and are entrapped therein by their gills. When the net, together with the cork and lead lines are drawn from the sea, it is frequently found that large schools of closely positioned fish have been gilled in the net. The size of each such catch is quite often too great to permit passage thereof through the restricted portion of previously available power-operated net-retrieving devices. It will be obvious that such prior equipment would be unsuitable for use in commercial fishing of the character described.

A major object of the present invention is to provide a method, together with a preferred form and an alternate form of the invention, that can be used to retrieve a cork line, an elongate net panel depending therefrom, a lead line supported from the lower edge of the panel, and fish gilled in the panel from the sea by a single operation from a small open boat on which the invention is installed, with the lines, net and gilled fish being brought aboard the boat and deposited therein at a desired location without the necessity of separating the fish from the net as it is drawn aboard.

Another object of the invention is to furnish a device that is operative when disposed at a low elevation relative to a fishing vessel, such as the height of the operator, to retrieve consecutive sections of the cork and lead lines, gill net and fish gilled therein, move same to a first position aboard the vessel where the sections are fully supported, concurrently moved from the first to a second position aboardship and thereafter move downwardly in sequence by force of gravity as a laterally directible column or mass to a third stationary position.

A still further object of the invention is to provide a method and apparatus capable of being used in carrying out that method by means of which a single operator in a small open fishing boat may retrieve a gill net and the catch therein from the sea in substantially less time and with considerably less effort than when done by hand by one or more men, which retrieving operation can be either continuous or intermittent as desired.

A still further object of the invention is to provide a device and method of using same of the character described by means of which a gill net can not only be retrieved from the sea, but as consecutive sections of the net, cork and lead lines associated therewith, and fish gilled in the net are drawn aboard a fishing vessel, these sections are moved while fully supported to any desired second position aboardship from which they may be directed downwardly to a third position, with this consecutive transferrence of net sections being conducted at a speed suitable to the operator without any physical strain.

Yet another object of the present invention is to provide a device of the character described by means of which as the net sections move from the first to the second position they can be raised to any desired elevation above the boat deck, with the operator at all times being able to regulate the frictional resistance encountered by the net, associated lines and the catch from the engaging portions of the invention while being drawn aboard the vessel.

A still further object of the invention is to supply a device that may be removably affixed to a small open fishing boat and easily removed therefrom for convenient storage after close of the fishing reason.

These and other objects and advantages of the method disclosed and claimed herein, together with a preferred and alternate form of the device for use in carrying out this method, will become apparent from the following description thereof, and from the accompanying drawing, in which:

FIGURE 1 is a preferred form of the invention shown removably mounted on the stern of a small open boat having no superstructure or elevated crane;

FIGURE 2 is a plan view of the device shown in FIGURE 1;

FIGURE 3 is a side elevational view of the device shown in FIGURE 2;

FIGURE 4 is a vertical cross-sectional view of the uppermost spools shown in FIGURE 3 together with the prime mover used in driving same; and, FIGURE 5 is a side elevational view of an alternate form of tapered spool that may be used with the present invention.

Referring to the drawing for the general arrangement of the preferred form of the invention, it will be seen to include a base A which is preferably removably mounted on the stern portion B of a small fishing vessel C having no elevated crane or superstructure. A first spool D is supported in a first position E above base A and transverse to the longitudinal axis thereof by a rotatable support means F which will hereinafter be described in detail.

A second spool G is longitudinally separated from spool D and is in an aligned, parallel second position H relative thereto and adjustably supported in this position at a desired elevation above base A by support means J which also will be described in detail hereinafter. An endless belt K extends between, and is drivingly supported by spools D and G. Spool G is power-driven by a prime mover G', as shown in FIGURES 2, 3 and 4.

A gill net L that includes a cork line M, lead line M', and an elongate net panel N, together with fish U which may be gilled in the net, can be consecutively retrieved from the sea by a single operator P in boat C by actuation of prime mover G' to so move belt K that the upper stretch K' thereof will move away from the stern of the boat. A first section of net L is laid on the upper stretch K' at the initiation of the retrieving operation, and if necessary, the operator P presses this section of the net L downwardly on the belt to increase the frictional engagement therebetween whereby the balance of the net in the sea, together with fish gilled therein, are drawn toward the boat.

During operation of the invention, consecutive sections of net L, together with the gilled fish, are moved in a fully supported condition from the first to the second position, and thereafter dropped downwardly as a moving column or mass that may be guided to a third position, which is normally the bottom or hold (not shown) of the fishing vessel C.

Base A, as can best be seen in FIGURES 2 and 3, is preferably formed from two parallel, laterally separated angle iron members 10 and 10' which include first elongate flanges 12 and 12' through which bolts 14 and 14' extend to removably affix these members to gunwales 16 and 16' of vessel C, or to inwardly disposed extensions of the gunwales in the stern portion of the boat, if such positioning is necessary. Members 10 and 10' also include elongate, upwardly extending second flanges 18 and 18' normally disposed relative to flanges 12 and 12'. A number of longitudinally spaced, downwardly extending slots 20 and 20' are formed in flanges 18 and 18', the purpose of which will later be described. Should it be desired, members 10 and 10' can be connected by a cross piece 22 positioned rearwardly of a rail 23 that is normally provided above the gunwales of vessel C as shown in FIGURE 3.

First spool D and second spool G are identical structurally, with the exception that the second spool is provided with a portion of a drive mechanism R, as shown in FIGURE 4, not required on the first spool. In detail, second spool G includes an intermediately disposed cylindrical shell 24, one end of which develops into a curved, outwardly projecting flange 25 of circular cross section, as well as a rib 26 also of circular cross section that extends inwardly to terminate in a tubular bearing 28. The other end of shell 24 develops into a flange 25', rib 26' and bearing 28' of substantially the same structure as flange 25, rib 26 and bearing 28, but oppositely disposed therefrom.

An elongate shaft 30 is provided on which bearings 28 and 28' are rotatably mounted. Threaded extensions 32 and 32' are formed on the ends of shaft 30, which extensions are smaller in transverse cross section than the shaft, and define body shoulders 33 and 33' respectively, at the junctions therewith. A first end piece is provided (FIGURE 4) that includes a circular plate 38 of such size that a lip 40 which extends inwardly from the circumferential edge thereof is closely positioned to the exterior surface of the outer extremity of flange 25. A boss 42 extends inwardly from the center of plate 38, and an inwardly disposed bore 44 and a coaxially aligned counter bore 46 of smaller cross section are formed therein, which define a ring-shaped seat 48 at the junction thereof.

Shaft extension 32 and the end portion of shaft 30 adjacent thereto are adapted to be inserted in bore 44 and counter bore 46 respectively, and when so disposed, shaft shoulder 33 and seat 48 are in abutting contact. Shaft extension 32 projects from plate 38 and engages an opening formed in the upper end portion of a downwardly extending link 50. Link 50, plate 38, and shaft 30 are held together as an integral unit by means of a nut 52 that is screwed tightly onto the projecting portion of extension 32.

Prime mover G' which may be an electric or hydraulic motor, or other suitable driving device, is bolted or otherwise secured to an outer portion of plate 38. A drive shaft 54, actuated by the prime mover G', extends through an opening 56 formed in plate 38 and supports a drive gear 58. Drive gear 58, together with a ring gear 60 engaged thereby and disposed in a circumferentially extending recess 62 formed in the outer portion of flange 25, comprise the drive mechanism R previously referred to. Screws 64, or other conventional fastening means, hold gear 60 in recess 62 in a fixed position relative to flange 25. The lower extremity of lip 40 has a lug 66 welded or otherwise rigidly secured thereto in a downwardly directed position, as can best be seen in FIGURES 3 and 4. The upper end portion of an elongated rigid supporting member 68 is secured by rivets 70, bolts, or other fastening means to lug 66. The purpose of supporting member 68 as well as link 50 will be explained hereinafter.

A second end piece 36' is provided for the opposite end of shaft 30, and is secured thereto in the same manner as end piece 36. End pieces 36 and 36' are of substantially the same structure, and therefore elements of end piece 36' that correspond with those previously described in connection with end piece 36 are identified herein by the same numerals, but with a prime added thereto. A supporting member 68' is provided for plate 38', with the upper portion thereof being bolted or otherwise secured to the lower portions of supporting members 68 and 68', and the transverse cross section of rod 72 is such as to permit removable insertion thereof in any one of the pairs of aligned slots 20 and 20'.

As previously mentioned, first spool D is of the same size and structure as second spool G, except that it does not include a drive mechanism R. Spool D is rotatably supported on a shaft 74 having duplicate end pieces 76 and 76' mounted thereon that are identical to end pieces 36 and 36', with the exception that a prime mover is not mounted on end piece 76. Shaft 74 is supported by two parallel, laterally separated brackets 78 and 78' that are affixed to the stern portions of members 10 and 10'.

Belt K (FIGURES 2 and 3) includes an endless band 80 that is fabricated from rubber or other resilient material, in which fabric or cord reinforcements are embedded. Longitudinally extending beads 82 and 82' are preferably formed on the edges of band 80. A number of spaced cleats 84 are formed on the exterior surface of band 80, which cleats taper rearwardly and inwardly from beads 82 and 82' when the band portion of which they form a part is so disposed as to define the upper stretch of band 80 (see FIGURE 2). Cleats 84 are preferably molded as an integral part of the material from which band 80 is fabricated.

Cleats 84 serve to materially increase friction engagement after initial contact with the cork and lead lines, net and gilled fish, and further assures successful withdrawal thereof from the sea when a net section extends the length of the upper stretch K' of the belt or band 80. Cleats 84 can be of any desired transverse cross section, but from experience it has been found desirable to have the depth of the outer extremity of each cleat 84 substantially the same as that of beads 82 and 82', with the upper edge of each cleat tapering inwardly toward the exterior surface of band 80 and becoming substantially flush therewith at the center of the band.

The second spool G is adapted to be readily disposed at a second position of desired elevation by manually placing rod 72 in the particular pair of slots 20 which so maintain supporting members 68 and 68' as to accomplish this result. It will be apparent that the more forwardly rod 72 is positioned in slots 20 and 20' from the stern of the boat, the higher the elevation of spool G in the second position.

Turnbuckle S (FIGURE 3) prevents inadvertent displacement of rod 72 from slots 20 and 20', and also maintains the desired tension on belt K. Turnbuckle S includes an elongate body 86 from which a ring-shaped handle 88 projects in substantially normal relationship thereto, and tapped bores are formed in the ends of this body that rotatably engage oppositely threaded rods 90 and 92. Rod 90 has an upper hooked end 94 that engages a bore formed in the lower portion of link 50. Rod 92 is pivotally, but non-rotatably connected by a fastener 96 to a portion of boat C, such as the bottom thereof.

Rotation of handle 88 and body 86 in one direction moves rods 90 and 92 toward one another, and supporting members 68, 68' pivot on rod 70 in a clockwise direction to lengthen the distance between spools D and G. This lengthening of the distance between spools D and G also results in lowering the elevation of spool G. Thus, before handle 88 is rotated to adjust spool G to a desired elevation, rod 70 should be disposed in a pair of slots 20, 20' from which the support members 68, 68' extend upwardly to hold spool G at a slightly higher elevation than actually desired. Subsequent rotation of handle 88 increases the tension on belt K and second roller G is lowered to a second position of the desired elevation.

The method of using the invention is quite simple. An end section of the net to be retrieved, including sections of cork line M, lead line M' and net N, are strung along the upper stretch K' of the belt, and upon actuation of prime mover G' the belt is caused to rotate. Due to frictional engagement between the end section of the net and associated lines resting on the upper stretch K' of the belt and the cleats 84 forming a part thereof, consecutive sections of the cork line M, lead line M', net N, and fish U gilled therein are drawn from the sea as the belt rotates to the first position previously described. Concurrently with this withdrawal from the sea, those sections of the cork line M, lead line M', net N and fish U that have reached the first position and are fully supported by the upper stretch K' of the belt, are moved thereby and fully supported, to the second position above second spool G. Consecutive sections of this net assembly, together with the gilled fish, pass over the section of belt K supported on second roller G and thereafter assume a depending position by action of gravity in which these sections define a downwardly moving column or mass that may be easily directed by the operator P to a desired third position.

An alternate form G'' of spool G is shown in FIGURE 5 wherein it will be noted that the cylindrical portion 24 thereof is defined by two frusto-conical shells 98 and 100, the small ends of which are in fixed abutment. When belt K is drivingly supported under tension on spool G'', it conforms to the configuration of shells 98 and 100 in two longitudinally extending half portions that taper inwardly toward one another. Fish U resting on the upper stretch K' of a belt so formed will have no tendency to slide laterally therefrom, but will instead tend to slide toward the center of the belt while disposed thereon.

It will be obvious to those skilled in the art that various changes may be made in the invention without departing from the spirit and scope thereof, and therefore the invention is not limited by that which is shown in the drawing and described in the specification, but only as indicated in the appended claims.

I claim:

1. A power driven device adapted to be disposed on the deck of a boat and to haul in a gill net provided with a lead line and a cork line from the operating position thereof in the sea to the said deck of said boat, including: a first spool provided with enlarged end portions and an intermediately positioned cylindrical portion; a second spool of substantially the same dimensions and configuration as said first spool and disposed at an inboard location apart from said first spool, two laterally separated base members affixed to portions of said boat, each of said base members including an upwardly disposed longitudinally extending flange which has a plurality of slots transversely aligned with similar slots provided in the other of said flanges, a first shaft; a pair of brackets supporting said first shaft transversely relatively to said base members, said first spool being rotatably supported on said first shaft and said brackets being affixed to said base members; a second transversely disposed shaft rotatably supporting said second spool; two elongated supporting members; a transversely positioned rod extending between the lower ends of said supporting members, said second shaft extending between the upper extremities of said elongated supporting members, said rod being removably insertable in any pair of said oppositely aligned slots and adapted to adjustably hold said second shaft and said second spool at a desired elevation relative to said boat; power means adapted to drive said second spool; and an endless belt having substantially the same width as the length of said cylindrical portion, extending between said first and second spools and operatively supported thereon.

2. A power-driven device as defined in claim 1 wherein said belt is substantially the same width as the length of said intermediately positioned cylindrical portions of said first and second spools on which said belt is drivingly supported; and said belt has a plurality of spaced protuberances formed on the exterior surface thereof that removably engage said cork line, lead line and gill net panel to increase the frictional contact between said belt and sections.

3. A power-driven device as defined in claim 1 wherein said belt is substantially the same width as the lengths of said intermediately positioned cylindrical portions of said first and second spools, with said belt having continuous, longitudinally extending beads formed on the exterior surface thereof, said belt having a plurality of longitudinally spaced ribs formed on the exterior surface thereof that extend across at least a portion of the width of said belt from said beads.

4. A power-driven device as defined in claim 1 wherein said belt is substantially the same width as the lengths of said intermediately positioned cylindrical portions of said first and second spools, with said belt having continuous, longitudinally extending beads formed on the exterior surface thereof, and said belt having a plurality of longitudinally spaced ribs formed on the exterior surface thereof that extend across at least a portion of the width of said belt from said beads, with at least a portion of said ribs being of substantially the thickness of said beads at the outer extremities thereof, and said ribs decreasing in thickness as they proceed across said belt.

5. A power-driven device as defined in claim 1 wherein said belt is substantially the same width as the lengths of said intermediately positioned cylindrical portions of said first and second spools, with said belt having continuous, longitudinally extending beads formed on the exterior surface thereof, and said belt having a plurality of longitudinally spaced ribs formed on the exterior surface thereof that extend across at least a portion of the width of said belt from said beads, with at least a portion of said ribs having a triangular transverse cross section.

6. A power-driven device as defined in claim 1 wherein said belt is substantially the same width as the lengths of said intermediately positioned cylindrical portions of said first and second spools, with said belt having continuous, longitudinally extending beads formed on the exterior surface thereof, said belt having a plurality of longitudinally spaced ribs formed on the exterior surface thereof that extend across at least a portion of the width of said belt from said beads, with said ribs being angularly disposed to extend in an opposing direction to that in which said upper stretch of said belt moves.

7. A power driven device adapted to be disposed on the deck of a boat and to haul in a gill net provided with a lead line and a cork line from the operating position thereof in the sea to the said deck of said boat, including: a first spool provided with enlarged end portions and an intermediately positioned cylindrical portion; a second spool of substantially the same dimensions and configuration as said first spool and disposed at an inboard location apart from said first spool, two laterally separated base members affixed to portions of said boat; a first shaft; a pair of brackets supporting said first shaft transversely relatively to said base members, said first spool being rotatably supported on said first shaft and said brackets being affixed to said base members; a second transversely disposed shaft rotatably supporting said second spool; a pair of supporting members extending upwardly from said base members, said second shaft extending between the upper extremities of said supporting members, and the lower end of said supporting members being longitudinally adjustably secured to said base members so as to adjustably hold said second shaft and said second spool at a desired elevation relative to said boat; power means adapted to drive said second spool; and an endless belt having substantially the same width as the length of said cylindrical portion, extending between said first and second spools and operatively supported thereon.

8. A power-driven device as defined in claim 7 wherein said belt is substantially the same width as the length of said intermediately positioned cylindrical portions of said first and second spools on which said belt is drivingly supported; and said belt has a plurality of spaced protuberances formed on the exterior surface thereof that removably engage said cork line, lead line and gill net panel to increase the frictional contact between said belt and sections.

9. A power-driven device as defined in claim 7 wherein said belt is substantially the same width as the lengths of said intermediately positioned cylindrical portions of said first and second spools, with said belt having continuous, longitudinally extending beads formed on the exterior surface thereof, said belt having a plurality of longitudinally spaced ribs formed on the exterior surface thereof that extend across at least a portion of the width of said belt from said beads.

References Cited in the file of this patent

UNITED STATES PATENTS

| | | |
|---|---|---|
| 423,627 | O'Neill | Mar. 18, 1890 |
| 548,964 | Connable | Oct. 29, 1895 |
| 575,142 | Bowers | Jan. 12, 1897 |
| 810,510 | Robins | Jan. 23, 1906 |
| 1,116,092 | McIntire | Nov. 3, 1914 |
| 2,514,429 | Waugh | July 11, 1950 |